(12) United States Patent
Kaltenbach

(10) Patent No.: US 9,309,971 B2
(45) Date of Patent: Apr. 12, 2016

(54) POWERSHIFT TRANSMISSION AND METHOD FOR OPERATION THEREOF

(71) Applicant: ZF Friedrichshafen AG, Friedrichshafen (DE)

(72) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/642,805

(22) Filed: Mar. 10, 2015

(65) Prior Publication Data
US 2015/0267809 A1    Sep. 24, 2015

(30) Foreign Application Priority Data

Mar. 21, 2014  (DE) .................... 10 2014 205 276

(51) Int. Cl.
*F16H 48/06* (2006.01)
*F16H 61/688* (2006.01)
*F16H 37/04* (2006.01)
(Continued)

(52) U.S. Cl.
CPC ............ *F16H 61/688* (2013.01); *F16H 37/046* (2013.01); *F16H 61/0403* (2013.01); *F16H 61/686* (2013.01); *F16H 3/006* (2013.01); *F16H 2037/048* (2013.01); *F16H 2037/049* (2013.01); *F16H 2200/2005* (2013.01); *F16H 2200/2094* (2013.01)

(58) Field of Classification Search
CPC ... F16H 61/688; F16H 61/686; F16H 37/046; F16H 61/0403; F16H 2200/2005; F16H 2037/048; F16H 2037/049; F16H 2200/2094
See application file for complete search history.

(56) References Cited

U.S. PATENT DOCUMENTS 8,408,084 B2    4/2013  Gitt et al.
2008/0228431 A1*  9/2008  Guggolz et al. ............. 702/147
(Continued)

FOREIGN PATENT DOCUMENTS

DE         102 60 179 A1    7/2004
DE    1 2005 018 978 A1    11/2006
(Continued)

OTHER PUBLICATIONS

German Search Report issued in corresponding German Application mailed on Nov. 19, 2015.

*Primary Examiner* — David J Hlavka
(74) *Attorney, Agent, or Firm* — Davis & Bujold, PLLC; Michael J. Bujold

(57) ABSTRACT

A powershift transmission with a dual-clutch main transmission and a downstream planetary gearset. The main transmission includes two partial transmissions and corresponding input shafts and clutches and a common output shaft. The downstream transmission has an input shaft which couples, via a third shifting element, the common output shaft and is fixed to a first planetary gearset element. The downstream transmission has an output shaft that is fixed to a second planetary gearset element. A third planetary gearset element couples a housing by way of a fourth shifting element, to obtain a low driving range of the downstream transmission, or, the downstream transmission output shaft by way of a fifth shifting element to obtain a high driving range of the downstream transmission. The common output shaft can couple, via a sixth shifting element, the third planetary gearset element, which can couple, via the fourth shifting element, the transmission housing.

14 Claims, 7 Drawing Sheets

(51) Int. Cl.
  *F16H 61/04*  (2006.01)
  *F16H 61/686* (2006.01)
  *F16H 3/00*   (2006.01)

(56) References Cited

U.S. PATENT DOCUMENTS

2008/0245167 A1\* 10/2008 Gitt ................................ 74/331
2012/0115674 A1\*  5/2012 Ikegami ........................... 477/3
2012/0234133 A1\*  9/2012 Ikegami et al. ................. 74/661
2013/0331227 A1\* 12/2013 Kato ................................ 477/3
2014/0038762 A1    2/2014 Wechs
2014/0100072 A1\*  4/2014 Kaltenbach et al. .......... 475/151
2014/0305239 A1\* 10/2014 Lubke et al. .................... 74/331

FOREIGN PATENT DOCUMENTS

DE  10 2007 047 671 A1  4/2009
DE  10 2008 031 456 A1  1/2010
DE  10 2011 088 396 A1  6/2013
DE  10 2012 213 711 A1  2/2014

\* cited by examiner

| GEAR | K1 | K2 | A | B | C | D | E | F | G | R | L | H | i | phi |
|------|----|----|---|---|---|---|---|---|---|---|---|---|------|------|
| 1 | X |   |   |   | X |   |   | X |   |   | X |   | 16,26 |   |
| 2 |   | X | X |   |   |   |   | X |   |   | X |   | 11,45 | 1,42 |
| 3 | X |   |   |   |   | X | X |   |   |   | X |   | 8,07 | 1,42 |
| 4 |   | X | X |   |   |   |   | X |   |   | X |   | 5,68 | 1,42 |
| 5 | X |   |   |   | X |   |   |   |   |   | X |   | 4,00 | 1,42 |
| 6 |   | X | X |   |   |   |   |   | X |   |   | X | 2,86 | 1,40 |
| 7 | X |   |   |   |   | X |   | X |   |   |   | X | 2,02 | 1,42 |
| 8 |   | X | X |   |   |   |   |   | X |   |   | X | 1,42 | 1,42 |
| 9 | X |   |   |   | X |   |   |   |   |   |   | X | 1,00 | 1,42 |
| 10 |   | X | X |   |   | X | X |   |   |   |   | X | 0,70 | 1,42 |
|    |   |    |   |   |   |   |   |   |   |   |   |   |      |      |
| R1 | X |   |   |   | X |   |   |   |   | X | X |   | -16,26 |   |
| R2 |   | X | X |   |   |   |   |   |   | X | X |   | -11,45 | 1,42 |
| R3 | X |   |   |   |   | X |   |   |   | X | X |   | -8,07 | 1,42 |
| R4 |   | X | X |   |   |   |   |   |   | X | X |   | -5,68 | 1,42 |

Fig. 2

| GEAR | K1 | K2 | A | B | C | D | E | F | G | R | L | H | i | phi |
|---|---|---|---|---|---|---|---|---|---|---|---|---|---|---|
| 1 | X |  |  | X |  |  |  | X |  |  |  | X | 16.38 |  |
| 2 |  | X | X |  |  |  |  | X |  |  |  | X | 11.96 | 1.37 |
| 3 | X |  |  |  |  | X | X |  |  |  |  | X | 8.73 | 1.37 |
| 4 |  | X | X |  |  |  |  | X |  |  |  | X | 6.37 | 1.37 |
| 5 | X |  |  |  | X |  |  |  |  |  |  | X | 4.65 | 1.37 |
| 6 | X |  |  | X |  |  |  |  | X |  |  | X | 3.52 | 1.32 |
| 7 |  | X | X |  |  |  |  |  | X |  |  | X | 2.57 | 1.37 |
| 8 | X |  |  |  | X |  | X |  |  |  |  | X | 1.88 | 1.37 |
| 9 |  | X | X |  |  |  |  |  | X |  |  | X | 1.37 | 1.37 |
| 10 | X |  |  |  | X |  |  |  |  |  |  | X | 1.00 | 1.37 |
| 11 |  | X | X |  | X | X |  |  |  |  |  | X | 0.73 | 1.37 |
|  |  |  |  |  |  |  |  |  |  |  |  |  |  |  |
| R1 | X |  |  |  | X |  |  |  |  | X | X |  | -16.38 |  |
| R2 |  | X | X |  |  |  |  |  |  |  | X | X | -11.96 | 1.37 |
| R3 | X |  |  |  |  | X |  |  |  | X | X |  | -8.73 | 1.37 |
| R4 |  | X | X |  |  |  |  |  |  | X | X |  | -6.37 | 1.37 |

Fig. 5

POWERSHIFT TRANSMISSION AND METHOD FOR OPERATION THEREOF

This application claims priority from German patent application serial no. 10 2014 205 276.9 filed Mar. 21, 2014.

FIELD OF THE INVENTION

The invention concerns a powershift transmission and methods for its operation.

BACKGROUND OF THE INVENTION

DE 10 2007 047 671 A1 describes a powershift transmission for a motor vehicle, having a main transmission in the form of a dual-clutch transmission and a downstream transmission in the form of a planetary gearset that is connected downstream from the main transmission. The main transmission comprises a first partial transmission and a second partial transmission, wherein a first main transmission input shaft of the first partial transmission is associated with a first frictional powershift clutch and a separate, second main transmission input shaft of the second partial transmission is associated with a second frictional powershift clutch. Each of the two partial transmissions of the main transmission in the form of a dual-clutch transmission comprises, respectively, at least one interlocking shifting element. For the two partial transmissions a common main transmission output shaft is provided. The downstream transmission in the form of a planetary gearset comprises a downstream transmission input shaft and a downstream transmission output shaft. The output shaft of the main transmission can be coupled by means of an interlocking shifting element to a first planetary gearset element of the downstream transmission. A second planetary gearset element of the downstream transmission is connected fixed to the output shaft of the downstream transmission. A third planetary gearset element of the downstream transmission can be coupled by means of further interlocking shifting elements either to the transmission housing or to one of the other two planetary gearset elements.

SUMMARY OF THE INVENTION

Starting from there the purpose of the present invention is to provide a new type of powershift transmission, in which shifts in the downstream transmission can be carried out as powershifts, and methods for its operation.

This objective is achieved by a powershift transmission as described below. According to the invention the, or each common main transmission output shaft for the two partial transmissions of the main transmission can be coupled by means of a sixth interlocking shifting element to the third planetary gearset element of the downstream transmission, which can be coupled to the transmission housing by means of the fourth, interlocking shifting element.

In the powershift transmission according to the invention, shifts in the downstream transmission, i.e. changes from the Low driving range to the High driving range or conversely, from the High range to the Low range, can be carried out as powershifts. The interlocking shifting elements present in the downstream transmission in order to obtain the Low and High ranges can be engaged and disengaged while they are free from load.

Preferably, the first planetary gearset element is a sun gear, the second planetary gearset element is a carrier and the third planetary gearset element is a ring gear. This design of the powershift transmission according to the invention is particularly preferred for ensuring powershifts in the downstream transmission.

Methods for operating the powershift transmission according to the invention are discussed below. These methods come to be used depending on how the highest gear in the Low driving range and the lowest gear in the High driving range are positioned in the partial transmissions of the main transmission, preferably in combination with one another, in a powershift transmission according to the invention.

BRIEF DESCRIPTION OF THE DRAWINGS

Preferred further developments emerge from the description given below. Example embodiments of the invention, to which it is not limited, are explained in more detail with reference to the drawings, which show:

FIG. 2: A first shifting matrix for the powershift transmission of FIG. 1;

FIG. 5: A second shifting matrix for the powershift transmission of FIG. 1;

DETAILED DESCRIPTION OF THE PREFERRED EMBODIMENTS

The present invention concerns a powershift transmission for a motor vehicle, as well as methods for its operation.

Figure 1:
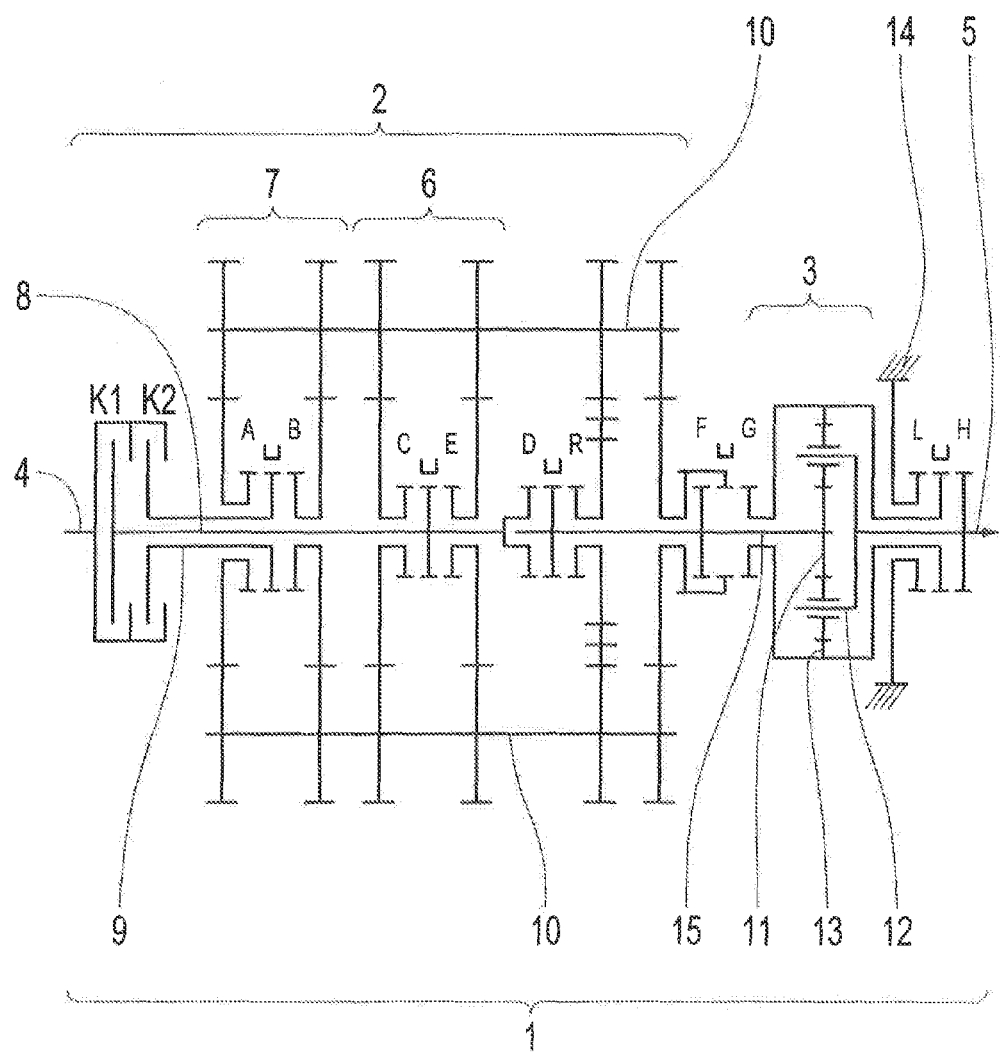
FIG. 1: A layout of a powershift transmission according to the invention.

FIG. 1 shows a schematic representation of a powershift transmission 1 which comprises a main transmission 2 in the form of a dual-clutch transmission and a downstream transmission 3 in the form of a planetary gearset connected downstream from the main transmission 2.

The powershift transmission 1 has a drive input shaft 4 and a drive output shaft 5. A drive aggregate of the motor vehicle can be coupled to the drive input shaft 4. A drive output of the motor vehicle can be coupled to the drive output shaft 5.

The main transmission 2 designed as a dual-clutch transmission comprises two partial transmissions, namely a first partial transmission 6 and a second partial transmission 7.

The first partial transmission 6 of the main transmission 2 formed as a dual-clutch transmission has a first main transmission input shaft 8, which is associated with a first frictional powershift clutch K1. When this first frictional powershift clutch K1 is closed, the drive input shaft 4 is coupled to the first main transmission input shaft 8 of the first partial transmission 6. Furthermore, the first partial transmission 6 has a plurality of first, interlocking shifting elements C, E, D.

The second partial transmission 7 of the main transmission 2 formed as a dual-clutch transmission, which comprises second, interlocking shifting elements A and B, has a second main transmission input shaft 9 which is associated with a second frictional powershift clutch K2. When the second frictional powershift clutch K2 is closed, the drive input shaft 4 is coupled to the second main transmission input shaft 9.

In the example embodiment shown, the two main transmission input shafts 8 and 9 of the two partial transmissions 6 and 7 of the main transmission 2 extend coaxially with one another, with the second main transmission input shaft 9 surrounding part of the first main transmission input shaft 8 concentrically on the outside.

At least one main transmission output shaft 10 common to both of the partial transmissions 6 and 7 of the main transmission 2 co-operates with the two partial transmissions 6, 7, and in the example embodiment shown there are two countershafts which form such main transmission output shafts 10.

The downstream transmission 3, in the form of a planetary gearset, comprises a downstream transmission input shaft 15 which can couple with the, or each main transmission output shaft 10 by means of a third interlocking shifting element F. When the third interlocking shifting element F is closed, the main transmission output shafts 10 are coupled to the downstream transmission input shaft 15.

The input shaft 15 of the downstream transmission is connected in a fixed manner to a first planetary gearset element 11 of the downstream transmission 3, namely to a sun gear thereof in the example embodiment shown.

In addition the downstream transmission 3 has a downstream transmission output shaft 5, which constitutes the drive output shaft 5 of the powershift transmission 1, this drive output shaft or downstream transmission output shaft 5 being connected fixed to a second planetary gearset element 12 of the downstream transmission 3, namely to a carrier of the downstream transmission 3 in FIG. 1.

The downstream transmission 3 also has a third planetary gearset element 13, this being a ring gear in the example embodiment of FIG. 1. Depending on the shift position of two further interlocking shifting elements L and H, the planetary gearset element 13 is coupled either to a transmission housing 14 or to the output shaft of the downstream transmission, or drive output shaft 5.

When a fourth interlocking shifting element L is closed, the third planetary gearset element 13 is coupled to the transmission housing 14 so that a so-termed Low driving range is engaged in the downstream transmission 3.

In contrast, when a fifth interlocking shifting element H is closed, the third planetary gearset element 13 of the downstream transmission 3 is coupled to the drive output shaft 5 so as to engage a so-termed High driving range in the downstream transmission 3. The blocking of the downstream transmission 3 achieved in this way can, in principle, be achieved by connecting any two elements of the planetary gearset.

The last two gearwheel planes of the main transmission 2 formed as a dual-clutch transmission, which contain the interlocking shifting element R, serve as drive input constants such that to obtain reversing gears the shifting element R is closed and to obtain forward gears the interlocking shifting element R is open.

In the multi-speed transmission 1 according to the invention the, or each main transmission output shaft 10 common to the two partial transmissions 6, 7 of the main transmission 2 can be coupled by means of a sixth, interlocking shifting element G to the third planetary gearset element 13 of the downstream transmission 3, in FIG. 1 therefore to the ring gear thereof, whereas this third planetary gearset element 13 can be coupled by means of the fourth, interlocking shifting element L to the transmission housing 14. As already explained above, the or each main transmission output shaft 10 of the two partial transmissions 6, 7 of the main transmission 2 can be coupled by means of the interlocking shifting element G to that planetary gearset element of the downstream transmission 3 which is connected to the transmission housing 14 when the Low driving range of the range group 3 is active.

The powershift transmission 1 according to the invention is independent of the specific design of the main transmission 2 made as a dual-clutch transmission, namely independent of the gearsets of the main transmission 2. Otherwise than in the dual-clutch transmission 2 shown in FIG. 1, a main transmission 2 can be used which is exclusively of planetary design or which is a mixed design combining a planetary design with countershafts. Otherwise than in the example embodiment of FIG. 1, there may be only one countershaft.

However, for the invention it is necessary that the two frictional powershift clutches K1 and K2 which co-operate with the two partial transmissions 6 and 7 of the main transmission 2, are present and that a planetary gearset is used as the downstream transmission 3, with which the interlocking shifting element G is associated in such manner that when the shifting element G is closed, the or each main transmission output shaft 10 can be coupled to the third planetary gearset element 13, which is coupled to the transmission housing 14 when the Low driving range is engaged in the downstream transmission 3.

With the powershift transmission shown in FIG. 1, for example the shifting matrix of FIG. 2 with ten forward gears 1 to 10 and four reverse gears R1 to R4 can be obtained, in which matrix an X in the columns K1, K2, A, B, C, D, E, F, G, R, L, H indicates that the shifting element concerned is closed. The column i shows the transmission ratio of the gear concerned and the column phi shows the gradation. The numerical examples given in the columns i and phi are purely example values.

In the powershift transmission of FIG. 1, which corresponds to the shifting matrix of FIG. 2, as described in detail below shifts in the downstream transmission 3, i.e. a change between the Low driving range and the High driving range, can be carried out as powershifts by opening and closing the interlocking shifting elements L and H.

To carry out a change of the driving range in the downstream transmission 3, i.e. to change between the Low driving range and the High driving range, a torque distribution at the powershift clutches K1 and K2 is adapted or matched to the fixed gear ratio of the downstream transmission 3 in such manner that the interlocking shifting elements L and H can be engaged and disengaged while free from load. During this the powershift clutches K1 and K2 may be operating in slip.

When a change of the driving range is carried out in the downstream transmission 3, one of the partial transmissions 6, 7 of the main transmission 2 is or remains coupled to the input shaft 15 of the downstream transmission, whereas in contrast the other partial transmission 7, 6 of the main transmission 2 is or remains coupled to the third planetary gearset element 13 of the downstream transmission 3, which in the Low driving range of the downstream transmission 3 is coupled to the transmission housing 14.

Thus, in the example embodiment of FIGS. 1 and 2, to shift or change the driving range in the downstream transmission 3 the first partial transmission 6 is coupled to the sun gear 11 of the downstream transmission 3, the second partial transmission 7 is coupled to the ring gear 13 of the downstream transmission 3, and the torque distribution at the powershift clutches K1 and K2 is chosen such that the shifting elements L and H can be engaged and disengaged while free from load. During this the powershift clutches K1 and K2 may be operating in slip.

During such a shift, i.e. during the change of driving range in the downstream transmission, the traction force on the drive output shaft 5 is maintained.

A further advantage is that the interlocking shifting elements L and H of the downstream transmission 3 are synchronized by means of the powershift clutches K1 and K2, so that no claims are made in respect of synchronization devices that might otherwise have to be associated with the interlocking shifting elements L and H.

Figure 3:
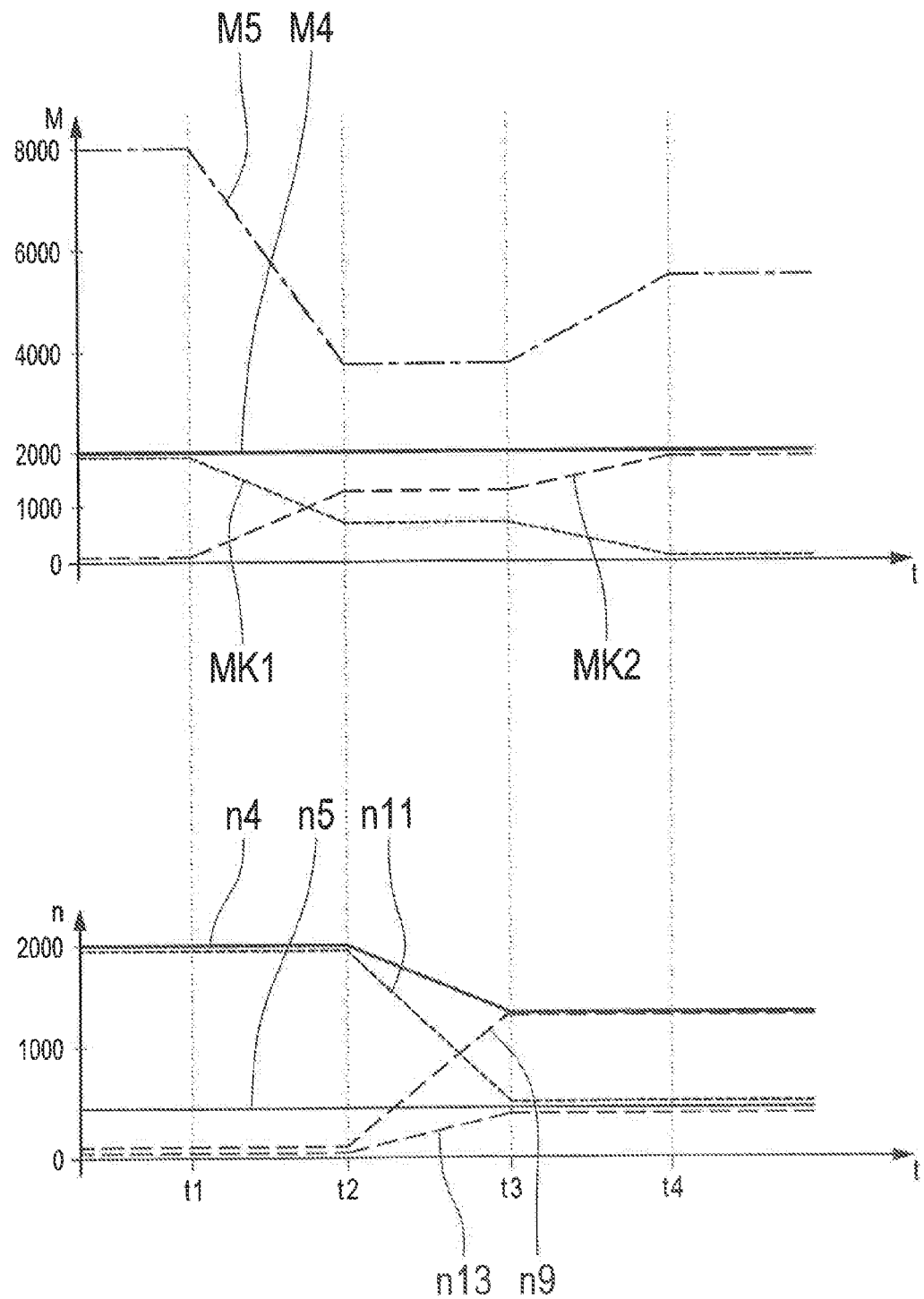
FIG. 3: A time diagram to make clear how a traction upshift is carried out in the powershift transmission of FIGS. 1 and 2.
Figure 4:
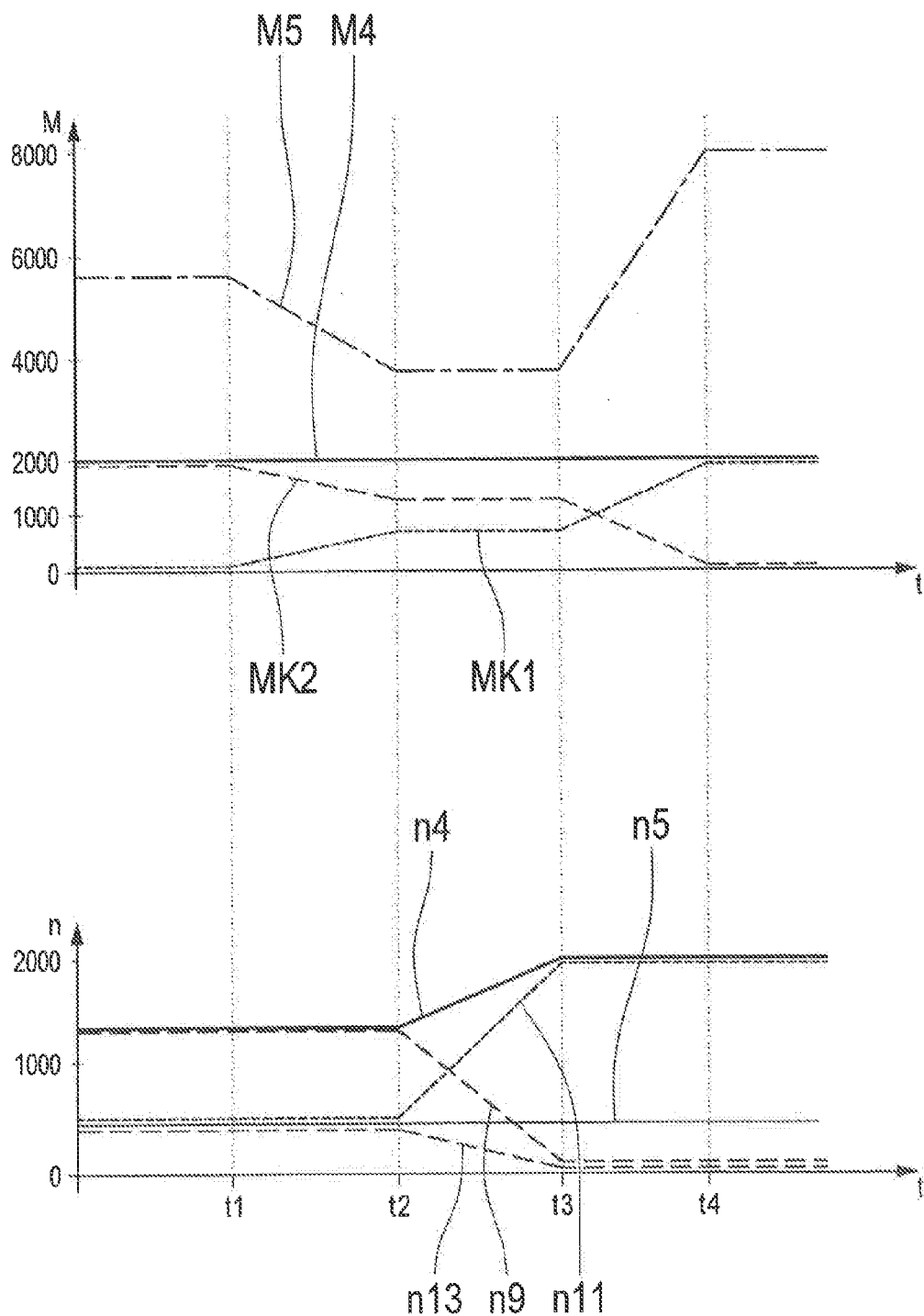
FIG. 4: A time diagram to make clear how a traction downshift is carried out in the powershift transmission of FIGS. 1 and 2.

Referring to FIGS. 3 and 4, it will now be described for the powershift transmission of FIGS. 1 and 2 how a traction upshift of the downstream transmission 3 from the highest gear of the Low driving range to the lowest gear of the High driving range (see FIG. 3) is carried out, and also how a traction downshift from the lowest gear of the High driving range to the highest gear of the Low driving range is carried out, bearing in mind that in the example embodiment of FIGS. 1 and 2 the highest gear of the Low range is gear 5 and the lowest gear of the High range is gear 6.

In this case it can be seen from the shifting matrix of FIG. 2 that the highest gear of the Low range is gear 5 and the lowest gear of the High range is gear 6, but that according to the shifting matrix of FIG. 2 these gears belong to different partial transmissions 6, 7.

Thus, according to the shifting matrix of FIG. 2, gear 5, i.e. the highest gear of the Low driving range, belongs to the first partial transmission 6.

According to the shifting matrix of FIG. 2, gear 6, i.e. the lowest gear of the High driving range, belongs to the second partial transmission 7.

As already stated earlier, below and with reference to the diagrams of FIGS. 3 and 4 that relate to the powershift transmission 1 according to FIG. 1 to which the shifting matrix of FIG. 2 applies, detailed descriptions of a traction upshift and a traction downshift in the downstream transmission 3 will be given. FIGS. 3 and 4 show plots against time t of a number of time variations of torques M and rotational speeds N, namely a torque variation M4 for a torque applied to the input shaft 4 by a drive aggregate, a torque variation M5 for the torque applied to the drive output shaft 5, and torque variations MK1 and MK2 for the torques transmitted by the powershift clutches K1 and K2.

In addition, time variations are shown for the rotational speed n4 of the drive input shaft 4 or the drive aggregate coupled thereto, a rotational speed n5 of the drive output shaft 5, a rotational speed n11 of the first planetary gearset element 11 of the downstream transmission 3, a rotational speed n13 of the third planetary gearset element 13 of the downstream transmission 3, and a rotational speed n9 of the second main transmission input shaft 9 of the second partial transmission 7 of the main transmission 2.

From FIGS. 3 and 4 it can be seen that in the figures it is assumed that the torque M applied by the drive aggregate to the drive input shaft 4 is constant, and further, that the rotational speed n5 of the drive output shaft 5 is constant, so that accordingly the vehicle is driving at a constant speed when the shift in the downstream transmission 3 is carried out.

When the traction upshift is carried out in accordance with FIG. 3, from the highest gear of the Low driving range (gear 5) to the lowest gear of the High driving range (gear 6), first of all, between time points t1 and t2 in FIG. 3 the fourth interlocking shifting element L is relieved from load. For this, at the second frictional powershift clutch K2 the transmission capacity is increased, namely in FIG. 3 for example along a ramp or linearly, the result of which is that part of the torque M4 delivered by the drive aggregate is transmitted, by way of the slipping powershift clutch K2 and by way of the second partial transmission 7, to the ring gear 13 of the downstream transmission 3.

The interlocking shifting element L becomes free from load when the torque on the ring gear 13 of the downstream transmission 3 amounts to i0 times the torque on the sun gear 11 of the downstream transmission 3, where i0 is the value of the fixed transmission ratio of the downstream transmission 3 in the form of a planetary gearset.

The sum of the torques transmitted by the powershift clutches K1 and K2 corresponds to the torque M4 delivered by the drive aggregate.

At the same time, to increase the transmission capacity of the second powershift clutch K2, the transmission capacity of the first powershift clutch K1 can be reduced, since thereafter the powershift clutch K1 will be brought to a slipping condition.

At time t2 in FIG. 3 the fourth, interlocking shifting element L can be disengaged while free from load.

Following the load-free disengagement of the shifting element L, between times t2 and t3 in FIG. 3 the fifth, interlocking shifting element H is synchronized. This is preferably done by changing the transmission capacity of the powershift clutch K1 and/or the transmission capacity of the powershift clutch K2 and/or the torque delivered by the drive aggregate to the drive input shaft 4, in order to increase the rotational speed of the ring gear 13 of the downstream transmission 3 and at the same time reduce the rotational speed n4 of the drive aggregate and the drive input shaft 4. Rotational speed changes are not shown in FIG. 3. At the end of the rotational speed adaptation, at time t3, the second frictional powershift clutch K2 can be brought to its gripping point, namely when the drive aggregate has been brought to its target rotational speed. When the powershift clutch K2 is gripping, its transmission capacity can be increased to the maximum transmission capacity. An actuator of the powershift clutch K2 then no longer needs to be operated in the control range.

At time t3 in FIG. 3 the fifth, interlocking shifting element H can be engaged while free from load. This shifting element H is engaged while free from load near or at the synchronous point, after which the downstream transmission 3 is in shifting position H, or block-rotating in the High driving range.

Between times t3 and t4 in FIG. 3, the shifting element H is loaded. By reducing the transmission capacity of the powershift clutch K1, the force flow in the gear 6 engaged passes by way of the ring gear 13 and the shifting element H. The powershift clutch K1 is now opened fully. The traction upshift has then been completed.

The process for carrying out a traction downshift from the lowest gear of the High driving range, i.e. from gear 6, to the highest gear of the Low driving range, i.e. to gear 5, in the powershift transmission of FIG. 1 which uses the shifting matrix of FIG. 2, is described below with reference to the time diagram shown in FIG. 4.

To carry out this traction downshift in the powershift transmission of FIG. 1 with the shifting matrix of FIG. 2 from the lowest gear of the High driving range to the highest gear of the Low driving range, first of all, between times t1 and t2 in FIG. 4 the fifth, interlocking shifting element H is freed from load. For this, in FIG. 4 the transmission capacity of the interlocking clutch K1 is increased, preferably along a ramp or in a linear manner, with the result that part of the torque M4 applied at the drive input shaft 4 is passed by way of the slipping powershift clutch K1 and the first partial transmission 6 to the sun gear 11 of the downstream transmission 3 in the form of the planetary gearset.

The interlocking shifting element H to be disengaged is free from load when the torque at the ring gear 13 of the downstream transmission 3 amounts to i0 times the torque on the sun gear 11, where i0 is the value of the fixed gear ratio of the planetary transmission 3.

The sum of the torques MK1 and MK2 transmitted by the powershift clutches K1 and K2 corresponds to the torque M4 applied to the drive input shaft 4.

At the same time, to increase the transmission capacity of the powershift clutch K1 the transmission capacity of the powershift clutch K2 can be reduced.

At time t2 in FIG. 4, the fifth, interlocking shifting element H is disengaged while free from load.

Following the load-free disengagement of the shifting element H, between times t2 and t3 in FIG. 4 the interlocking shifting element L is synchronized. This is done in particular by changing the transmission capacity of the powershift clutch K1 and/or by changing the transmission capacity of the powershift clutch K2 and/or by changing the torque from the drive aggregate which is applied as the torque M4 to the drive input shaft 4. This increases the rotational speed n11 of the sun gear. In order to be able, with the powershift clutch K1, to transmit a positive torque by way of the powershift clutch K1, the rotational speed n4 at the drive input shaft 4 and hence the rotational speed of the drive aggregate must be higher than the rotational speed n11 of the sun gear, which corresponds to the rotational speed of the first main transmission input shaft 8 of the first partial transmission 6. Accordingly, the rotational speed n4 is increased at the same time. However, increasing the rotational speed n4, i.e. the rotational speed of the transmission input shaft 4, does not have to begin exactly at time t2 as shown in FIG. 4; rather, the rotational speed n4 can be increased with some time delay.

At the end of the rotational speed adaptation or synchronization of the shifting element L at time t3 in FIG. 4, the first powershift clutch K1 can be brought to its gripping point, namely when the rotational speed n4 has been brought to the target rotational speed. When the powershift clutch K1 is gripping, its transmission capacity can be increased to the maximum transmission capacity and in such a case the actuator of the powershift clutch K1 no longer has to be operated in the control range. When the shifting element L has been synchronized, at time t3 in FIG. 4 the shifting element L can be engaged without load, this taking place at or near the synchronization point of the shifting element L. In the downstream transmission 3 the Low driving range is then engaged.

Thereafter, between times t3 and t4 in FIG. 4 the load at the shifting element L is built up, in particular by reducing the transmission capacity of the frictional powershift clutch K2 whereby, since the fifth gear is now engaged, the force flow is transmitted by way of the sun gear 11 and the shifting element L. The second powershift clutch K2 is then fully opened, thereby completing the traction downshift of FIG. 4.

The traction upshift and traction downshift described above can be carried out as powershifts. Group shifts in overdrive, i.e. changes of the driving range in the downstream transmission 3 during overdrive operation, cannot be carried out as powershifts as a matter of course since the rotational speed at the drive input shaft 4 would have to be reduced to zero. Thus, the powershift clutches K1 and K2 can only transmit thrust when the rotational speed of the drive input shaft 4 is lower than the clutch rotational speed on the secondary side, i.e. the rotational speed of the main transmission input shafts 8 and 9.

In order nevertheless to enable advantageous overdrive upshifts and overdrive downshifts in the powershift transmission of FIG. 1 with the shifting matrix of FIG. 2, to carry out an overdrive upshift from the highest gear of the Low driving range to the lowest gear of the High driving range or, conversely, to carry out an overdrive downshift from the lowest gear of the High driving range to the highest gear of the Low driving range, to synchronize the respective shifting element L or H that has to be synchronized, preferably with the drive aggregate disconnected, the drive input shaft 4 is blocked or braked to a standstill, in particular by a holding device. As regards other details, reference can be made to the explanations concerning FIGS. 3 and 4.

FIG. 5 shows an alternative shifting matrix for the powershift transmission of FIG. 1, such that in the shifting matrix in FIG. 5, the highest gear of the Low driving range, namely gear 5, and the lowest gear of the High driving range, namely gear 6, are in the same partial transmission, namely the first partial transmission 6. Thus, according to the shifting matrix of FIG. 5, in these two gears the powershift clutch K1 is in each case closed.

Nevertheless range changes in the downstream transmission 3 can be carried out as powershifts, namely if in FIG. 1 the ring gear 13 of the downstream transmission 3 is coupled by way of the second-lowest gear of the High driving range, i.e. the seventh forward gear, to the other, second partial transmission 7, and during the entire powershifting process the powershift clutch K2 that co-operates with this second partial transmission 7 is operated with slip.

Further details for carrying out a traction upshift and a traction downshift in the powershift transmission of FIG. 1 using the shifting matrix shown in FIG. 5 are described below with reference to FIGS. 6 and 7; in FIGS. 6 and 7, again a number of torque variations M and rotational speed variations n are plotted as a function of time t, namely a torque variation M5 for the torque applied to the drive output shaft 5, a torque M4 for the torque applied to the drive input shaft 4 and delivered by the drive aggregate, torque variations MK1 and MK2 for the torques transmitted by the powershift clutches K1 and K2, a rotational speed variation n4 for the rotational speed of the drive input shaft and hence of the drive aggregate, a rotational speed variation n5 for the rotational speed of the output shaft 5, rotational speed variations n8 and n9 for the rotational speeds of the two main transmission input shafts 8 and 9 of the main transmission 2, and a rotational speed variation n13 for the rotational speed of the ring gear of the downstream transmission 3 made as a planetary gearset.

Figure 6:
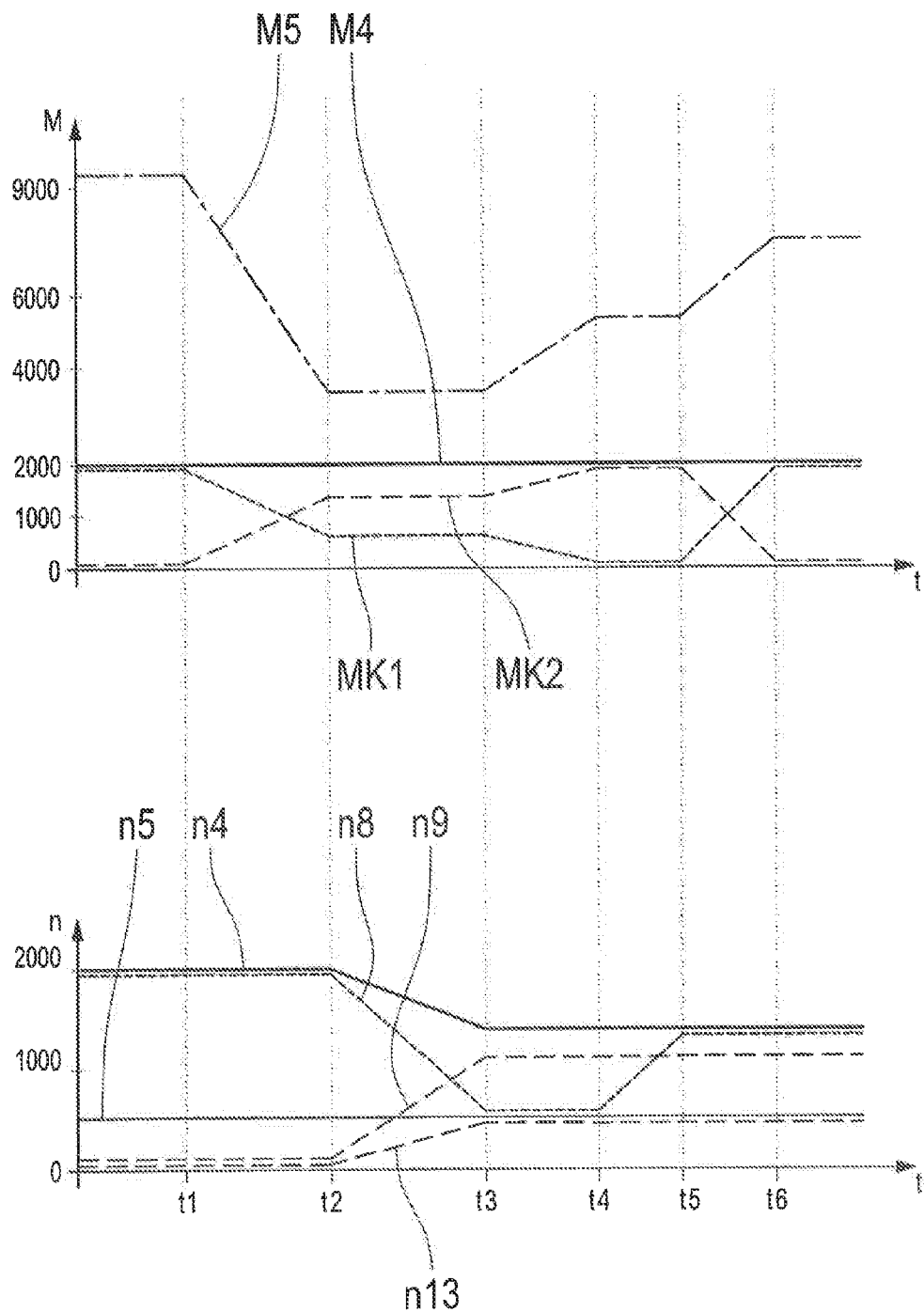
FIG. 6: A time diagram to make clear how a traction upshift is carried out in the powershift transmission of FIGS. 1 and 4.
Figure 7:
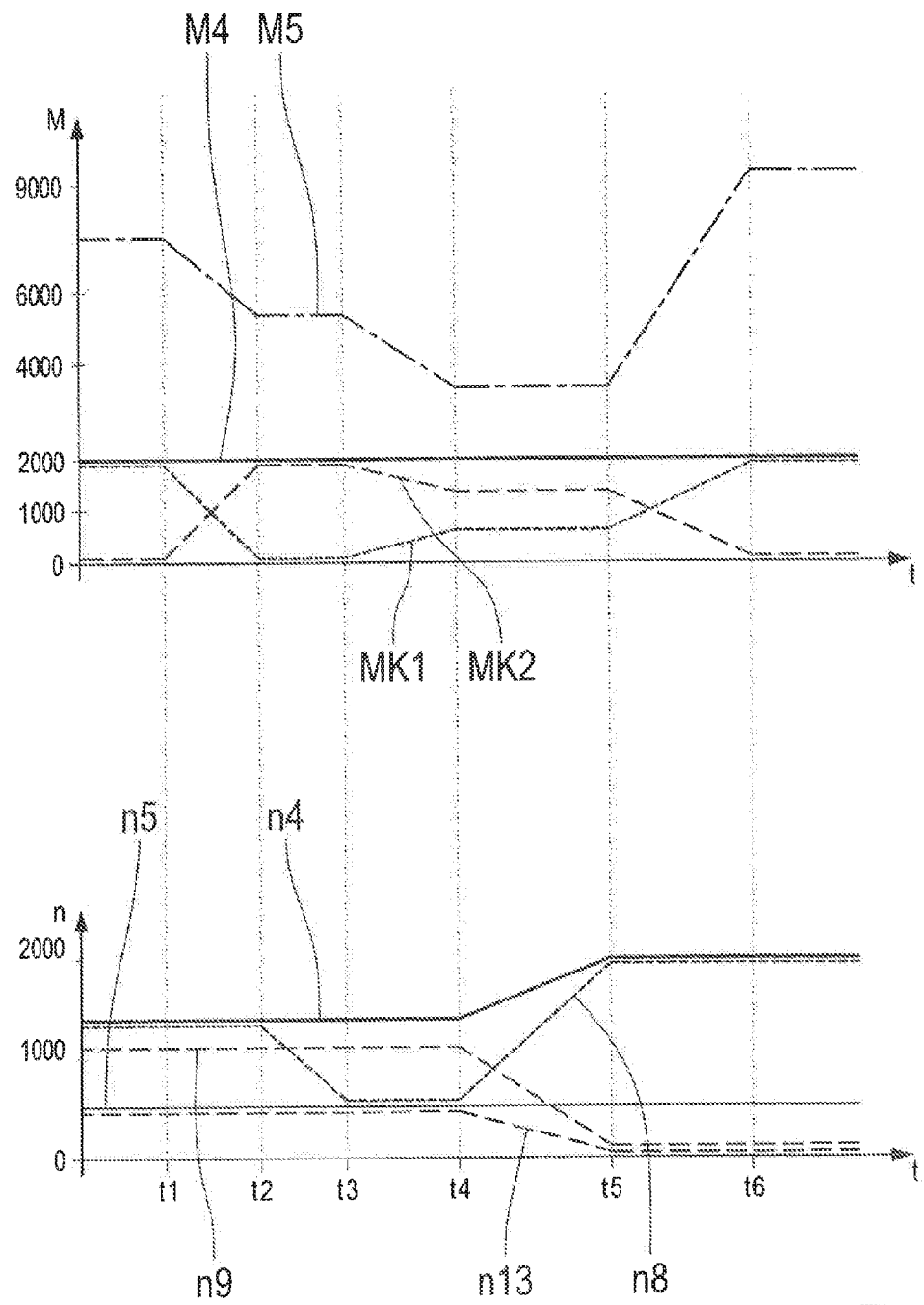
FIG. 7: A time diagram to make clear how a traction downshift is carried out in the powershift transmission of FIGS. 1 and 4.

In FIGS. 6 and 7 it is assumed that the torque M4 applied at the drive input shaft 4 is constant, and furthermore that the rotational speed n5 of the drive output shaft 5 is constant, so that the vehicle is driving at a constant speed.

To carry out a traction upshift from the highest gear of the Low driving range to the lowest gear of the High driving range in the powershift transmission of FIG. 1 in accordance with the shifting matrix of FIG. 5, in which these two gears both belong to the partial transmission 6 of the main transmission 2, the shifting element L is first relieved from load, namely between times t1 and t2 in FIG. 6. For this the transmission capacity of the powershift clutch K2 is increased, preferably along a ramp or linearly, the result of which is that part of the torque M4 delivered by the drive aggregate and applied to the drive input shaft 4 flows by way of the slipping powershift clutch K2 and the second partial transmission 7.

The shifting element L is free from load when the torque on the ring gear 13 of the downstream transmission 3 made as a planetary gearset corresponds to i0 times the torque on the sun gear 11 of the planetary gearset, where i0 is the value of the fixed gear ratio of the planetary gearset.

The sum of the torques MK1 and MK2 transmitted by the two powershift clutches K1 and K2 corresponds to the torque M4 at the drive input shaft 4.

At the same time as the transmission capacity of the powershift clutch K2 is increased, the transmission capacity of the powershift clutch K1 can be reduced. At time t2 in FIG. 6 the shifting element L is free from load and can be disengaged in the load-free condition.

Thereafter, between times t1 and t2 in FIG. 6 the shifting element H is synchronized. This is preferably done by adapting the transmission capacity of the powershift clutch K1 and/or by adapting the transmission capacity of the powershift clutch K2 and/or by adapting the torque of the drive aggregate or the torque M4 at the drive input shaft 4. This increases the rotational speed n13 of the ring gear while at the same time the rotational speed n4 is reduced. The torque changes are not shown in the diagram shown in FIG. 6. The rotational speed adaptation for the rotational speed n4 of the drive input shaft 4 or of the drive aggregate is carried out until it has been brought to the target rotational speed for the sixth gear. The powershift clutch K2 is operating permanently with slip, since the second partial transmission 7 has the gear ratio of the next-higher gear, i.e. the seventh gear. At time t3 the shifting element H can be engaged while free from load, this being done at or near the synchronous point of the shifting element H. At that time the downstream transmission 3 is in the so-termed High driving range.

Thereafter, between times t3 and t4 in FIG. 6 the shifting element H is freed from load, namely by reducing the transmission capacity of the powershift clutch K1, whereby the force flow passes by way of the ring gear 13 and the shifting element H.

After that, between times t4 and t5 in FIG. 6 a load-free shift of the first partial transmission 6 from the fifth gear to the sixth gear takes place, and during this shift the force flow is again transmitted by way of the seventh gear as a supporting gear while the second powershift clutch K2 is slipping. Then, between times t6 and t7 the powershift clutch K1 takes up the load while the load on the second powershift clutch K2 is reduced, so that the gear ratio of the sixth gear is now effective.

At time t6 in FIG. 6 the powershift from the fifth gear to the sixth gear, i.e. the traction upshift in the downstream transmission 3 from the Low driving range to the High driving range, is complete.

FIG. 7 shows details for carrying out a traction downshift in the powershift transmission of FIG. 1 using the shifting matrix of FIG. 5. FIG. 7 concerns a powershift in the downstream transmission 3, namely a downshift from the lowest gear of the High driving range, i.e. gear 6, to the highest gear of the Low driving range, i.e. gear 5. During this process, as in the traction upshift described with reference to FIG. 6, the second-lowest gear of the High driving range serves as a supporting gear. In the second partial transmission 7 of the main transmission 2, by means of the shifting element B the second-highest gear of the High driving range, i.e. the seventh forward gear, is preselected.

To carry out the traction downshift, first of all and with the help of the second powershift clutch K2 a load reduction takes place, during which the gear ratio of the supporting gear is effective. The powershift clutch K1 and the first partial transmission 6 are free from load. The powershift clutch K2 is operated with slip and, during all the following phases of the powershift until time t6 in FIG. 7, it is transmitting a torque.

Next, in the first partial transmission 6 between times t2 and t3 in FIG. 7 the highest gear of the Low driving range, i.e. the fifth gear, is preselected. Then, between times t3 and t4 in FIG. 7 the shifting element H is unloaded. For that, the transmission capacity of the powershift clutch K1 is increased, preferably along a ramp or linearly, with the result that part of the torque M4 delivered by the drive aggregate and applied to the drive input shaft 4 is transmitted to the sun gear 11 by way of the slipping powershift clutch K1 and via the first partial transmission 6.

The interlocking shifting element H is free from load when the torque on the ring gear 13 of the planetary gearset 3 corresponds to i0 times the torque on the sun gear 11, where i0 is again the value of the fixed gear ratio of the downstream transmission 3 in the form of a planetary gearset.

The sum of the torques MK1 and MK2 transmitted by the two powershift clutches K1 and K2 corresponds to the torque M4 at the drive input shaft 4, delivered by the drive aggregate.

At time t4 in FIG. 7, the shifting element H is disengaged while free from load.

Thereafter, between times t4 and t5 in FIG. 7 the shifting element L is synchronized, in particular by changing the transmission capacity of the powershift clutch K1 and/or by changing the transmission capacity of the powershift clutch K2 and/or by changing the torque M4 on the drive input shaft 4. This reduces the rotational speed n13 of the ring gear 13 down to zero. At the same time the rotational speed n11 of the sun gear and the rotational speed n8 of the first main transmission input shaft 8 increase. To be able to transmit a positive torque by means of the powershift clutch K1, the rotational speed n4 of the drive aggregate or drive input shaft 4 must always be higher than the rotational speed n8 of the first main transmission input shaft 8. Thus, the rotational speed n4 is increased at the same time. However, the increase of the rotational speed n4 does not have to begin exactly at time t4 as shown in the diagram, but rather this too can take place with some delay.

At the end of the rotational speed adaptation or synchronization at time t5 in FIG. 7, the powershift clutch K1 can be brought to its gripping point, namely when the rotational speed n4 has been brought to the target rotational speed. When the powershift clutch K1 is gripping, its transmission capacity can be increased to the maximum transmission capacity. At time t5, the shifting element L is engaged while free from load, and this takes place at or near its synchronous point. At time t5 the Low driving range is engaged in the downstream transmission 3.

Thereafter, between times t5 and t6 in FIG. 7 the load on the shifting element L is increased, in particular by reducing the transmission capacity of the powershift clutch K2, whereby the force flow of the fifth gear passes via the sun gear 11 and the shifting element L. The powershift clutch K2 is fully opened and the traction downshift in accordance with FIG. 7 has then been completed.

INDEXES

1 Powershift transmission
2 Main transmission
3 Downstream transmission
4 Drive input shaft
5 Drive output shaft/Output shaft of the downstream transmission
6 First partial transmission
7 Second partial transmission
8 First main transmission input shaft
9 Second main transmission input shaft
10 Main transmission output shaft
11 First planetary gearset element
12 Second planetary gearset element 13 Third planetary gearset element
14 Housing
15 Input shaft of the downstream transmission
K1 First frictional powershift clutch
K2 Second frictional powershift clutch
A Second shifting element
B Second shifting element
C First shifting element
D First shifting element
E First shifting element
F Third shifting element
G Sixth shifting element
H Fifth shifting element
L Fourth shifting element
R Seventh shifting element

The invention claimed is:

1. A powershift transmission (1) for a motor vehicle, the powershift transmission comprising:
a main transmission (2), in a form of a dual-clutch transmission, and a downstream transmission (3), in a form of a planetary gearset, connected downstream from the main transmission (2);
the main transmission (2) comprising first and second partial transmissions (6, 7) and at least one main transmission output shaft (10) which is common to both of the first and the second partial transmissions,
the first partial transmission having a first main transmission input shaft (8), at least one first, interlocking shifting element, and a first frictional powershift clutch (K1), and
the second partial transmission having a second main transmission input shaft (9), at least one second, interlocking shifting element, and a second frictional powershift clutch (K2);
the downstream transmission (3) having a downstream transmission input shaft (15) which is connectable, via a third, interlocking shifting element (F), to the at least one main transmission output shaft (10), and the downstream transmission input shaft (15) is fixed to a first planetary gearset element (11) of the downstream transmission (3),
the downstream transmission (3) having a downstream transmission output shaft (5) which is fixed to a second planetary gearset element (12) of the downstream transmission (3),
a third planetary gearset element (13), of the downstream transmission (3), being connectable to either a transmission housing (14) by a fourth, interlocking shifting element (L) to obtain a low driving range of the downstream transmission (3), or to one of the first and the second planetary gearset elements (11, 12) by a fifth, interlocking shifting element (H) to obtain a high driving range of the downstream transmission (3); and
the at least one main transmission output shaft (10), common to both of the first and the second partial transmissions (6, 7) of the main transmission (2), is connectable, via a sixth, interlocking shifting element (G), to the third planetary gearset element (13) of the downstream transmission (3), which is connectable, via the fourth, interlocking shifting element (L), to the transmission housing (14).

2. The powershift transmission according to claim 1, wherein the first planetary gearset element (11) is a sun gear, the second planetary gearset element (12) is a carrier and the third planetary gearset element (13) is a ring gear.

3. A method of operating a powershift transmission (1) of a motor vehicle which comprises a main transmission (2), in a form of a dual-clutch transmission, and a downstream transmission (3), in a form of a planetary gearset, connected downstream from the main transmission (2); the main transmission (2) comprises first and second partial transmissions (6, 7) and at least one main transmission output shaft (10), common to both of the first and the second partial transmissions, the first partial transmission has a first main transmission input shaft (8), at least one first, interlocking shifting element, and a first frictional powershift clutch (K1), and the second partial transmission has a second main transmission input shaft (9), at least one second, interlocking shifting element, and a second frictional powershift clutch (K2); the downstream transmission (3) has a downstream transmission input shaft (15) which is connectable, via a third, interlocking shifting element (F), to the at least one main transmission output shaft (10), and the downstream transmission input shaft (15) is fixed to a first planetary gearset element (11) of the downstream transmission (3), the downstream transmission (3) has a downstream transmission output shaft (5) which is, fixed to a second planetary gearset element (12) of the downstream transmission (3); a third planetary gearset element (13) of the downstream transmission (3) is connectable to either a transmission housing (14) by a fourth, interlocking shifting element (L) to obtain a low driving range of the downstream transmission (3), or to one of the first and the second planetary gearset elements (11, 12) by a fifth, interlocking shifting element (H) to obtain a high driving range of the downstream transmission (3); and the at least one main transmission output shaft (10), common to both of the first and the second partial transmissions (6, 7) of the main transmission (2), is connectable, via a sixth, interlocking shifting element (G), to the third planetary gearset element (13) of the downstream transmission (3), and the third planetary gearset element (13) is connectable, via the fourth, interlocking shifting element (L), to the transmission housing (14), the method comprising the steps of:
carrying out a shift between the high and the low driving ranges, in the downstream transmission (3), by adapting a torque distribution at the first and the second powershift clutches (K1, K2) to a fixed gear ratio of the downstream transmission (3) such that the fourth, interlocking shifting element (L) and the fifth, interlocking shifting element (H) engage and disengage while free from load.

4. The method according to claim 3, further comprising the steps of carrying out the shift by, either coupling or maintaining coupling of one of the first and the second partial transmissions (6, 7) of the main transmission (2) to the input shaft (15) of the downstream transmission, and either coupling or maintaining coupling of the other one of the first and the second partial transmissions (7, 6) of the main transmission (2) to the third planetary gearset element (13) of the downstream transmission (3), which in the low driving range of the downstream transmission (3) is coupled to the transmission housing (14).

5. The method according to claim 3, further comprising the steps of, if a highest gear of the low driving range of the downstream transmission (3) and a lowest gear of the high driving range of the downstream transmission (3) belong to different ones of the first and the second partial transmissions (6, 7) of the main transmission (2), then carrying out a traction upshift from the highest gear of the low driving range to the lowest gear of the high driving range by initially relieving load of the fourth, interlocking shifting element (L), then disengaging the fourth, interlocking shifting element (L) while free from load, then synchronizing the fifth, interlocking shifting element (H), and then engaging the fifth, interlocking shifting element (H) while free from load.

6. The method according to claim 5, further comprising the step of synchronizing the fifth, interlocking shifting element (H) by adapting at least one of a transmission capacity of the first powershift clutch (K1), a transmission capacity of the second powershift clutch (K2), and torque at a drive input shaft (4) of the powershift transmission.

7. The method according to claim 3, further comprising the steps of, if a highest gear of the low driving range of the downstream transmission (3) and a lowest gear of the high driving range of the downstream transmission (3) belong to different ones of the first and the second partial transmissions (6, 7) of the main transmission (2), then carrying out a traction downshift from the lowest gear of the high driving range to the highest gear of the low driving range by initially relieving the load from the fifth, interlocking shifting element (H), then disengaging the fifth, interlocking shifting element (H) while free from load, then synchronizing the fourth, interlocking shifting element (L), and then engaging the fourth, interlocking shifting element (L) while free from load.

8. The method according to claim 7, further comprising the step of synchronizing the fourth, interlocking shifting element (L) by adapting at least one of a transmission capacity of the first powershift clutch (K1), a transmission capacity of the second powershift clutch (K2), and torque at a drive input shaft (4) of the powershift transmission.

9. The method according to claim 3, further comprising the steps of, if a highest gear of the low driving range of the downstream transmission (3) and a lowest gear of the high driving range of the downstream transmission (3) belong to different ones of the first and the second partial transmissions (6, 7) of the main transmission (2), then carrying out at least one of an overdrive upshift from the highest gear of the low driving range to the lowest gear of the high driving range, and an overdrive downshift from the lowest gear of the high driving range to the highest gear of the low driving range, to synchronize the particular one of the fourth or the fifth shifting elements (L, H) that has to be engaged, and locking a drive input shaft (4) of the powershift transmission with a drive aggregate of the motor vehicle disconnected.

10. The method according to claim 3, further comprising the steps of, if a highest gear of the low driving range of the downstream transmission (3) and a lowest gear of the high driving range of the downstream transmission (3) belong to a same one of the first and the second partial transmissions (6) of the main transmission (2), then coupling the third planetary gearset element (13) of the downstream transmission (3) to the other of the first and the second partial transmissions (7) by way of a second-lowest gear of the high driving range, and operating the powershift clutch (K2) associated with the other of the first and the second partial transmissions (7) with slip throughout an entirety of the powershift.

11. The method according to claim 10, further comprising the steps of carrying out a traction upshift from the highest gear of the low driving range to the lowest gear of the high driving range, by initially relieving the fourth, interlocking shifting element (L) of load, then disengaging the fourth, interlocking shifting element (L) while free from load, then synchronizing the fifth, interlocking shifting element (H), then engaging the fifth interlocking shifting element (H) while free from load, then building up load at the fifth, interlocking shifting element (H), then, carrying out, in whichever one of the first and the second partial transmissions contains the highest gear of the low driving range and the lowest gear of the high driving range, a load-free shift, and during the load-free shift, supporting traction force at the downstream transmission output shaft (5) with the other one of the first and the second partial transmissions and operating the powershift clutch (K2) of the other one of the first and the second partial transmissions operating with slip, and thereafter shifting the load between the first and the second powershift clutches (K1, K2) of the first and the second partial transmissions.

12. The method according to claim 11, further comprising the step of synchronizing the fifth, interlocking shifting element (H) by adapting at least one of a transmission capacity of the first powershift clutch (K1), a transmission capacity of the second powershift clutch (K2) and the torque at the drive input shaft (4) of the powershift transmission.

13. The method according to claim 10, further comprising the steps of carrying out a traction downshift from the lowest gear of the high driving range to the highest gear of the low driving range, by initially carrying out a load shift from the powershift clutch (K1) of the partial transmission (6) which contains the lowest gear of the high driving range and the highest gear of the low driving range, to the powershift clutch (K2) of the other partial transmission (7), then preselecting the highest gear of the low driving range in the load-free partial transmission (6), then unloading the fifth, interlocking shifting element (H), then disengaging the fifth, interlocking shifting element (H) while free from load, then synchronizing the fourth, interlocking shifting element (L), then engaging the fourth, interlocking shifting element (L) while free from load, and then building up load at the fourth, interlocking shifting element (L).

14. The method according to claim 13, further comprising the step of synchronizing the fourth, interlocking shifting element (L) by adapting at least one of a transmission capacity of the first powershift clutch (K1), a transmission capacity of the second powershift clutch (K2), and torque at the drive input shaft (4).

* * * * *